United States Patent Office 3,329,892
Patented July 4, 1967

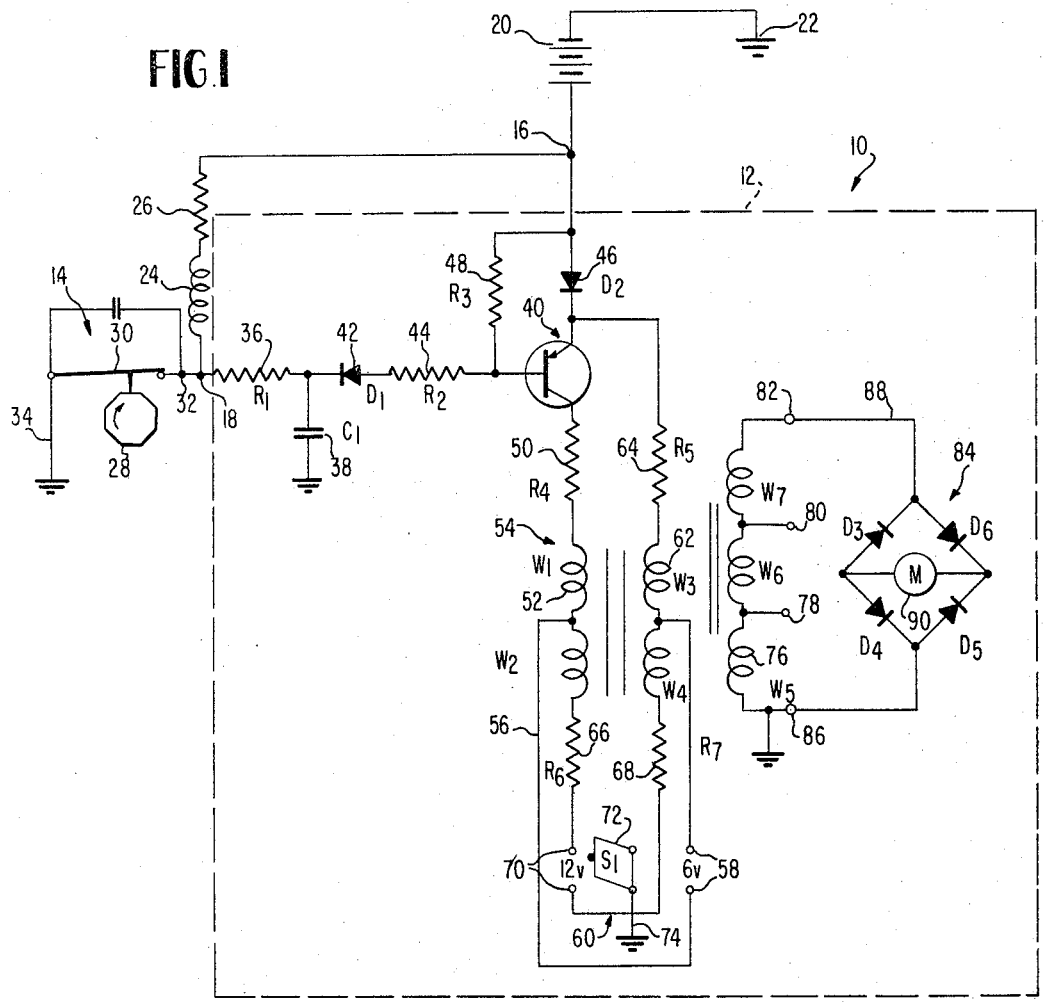

3,329,892
ELECTRICAL TACHOMETER WITH SATURABLE CORE TRANSFORMER HAVING MULTI-SECTION WINDINGS
Clement R. Arrison, North Tonawanda, N.Y., assignor to Radatron Research & Development Corp., North Tonawanda, N.Y., a corporation of New York
Filed May 14, 1964, Ser. No. 367,416
4 Claims. (Cl. 324—70)

This invention relates to a novel tachometer and more particularly to an inexpensive, reliable electrical tachometer for measuring the speed of an internal combustion engine.

Most conventional tachometers for measuring the speed of internal combustion engines and particularly automotive engines use one of two techniques to achieve their end result. The most common tachometer used today is the capacitor discharge integrating circuit. This can be driven from either a transistor or a relay. The second type of tachometer is the mechanical type that is hooked directly to the engine crank shaft and works much like the speedometer on the automobile with the exception that it measures the engine's r.p.m. All of the available tachometers of both these types require relatively sensitive and expensive meter movements.

For example, in a conventional tachometer circuit using the capacitive discharge system, the limiting point in design of the meter movement is that only six or twelve volts are available to store energy in the capacitor. This means that for practical purposes, the meter movement must have a typical sensitivity of one milliamp and about 100 ohms resistance. This requires a D'Arsonval or moving coil meter movement and rules out almost entirely the use of less expensive moving magnet meters. Typical moving magnet meter movements available are in the neighborhood of five milliamps and between 500 and 1500 ohms resistance and hence cannot be used.

The present invention overcomes the above-mentioned difficulty by providing a simplified tachometer circuit of the saturable core transformer type which allows the use of very inexpensive, low sensitivity moving magnet type meters. In addition to very significantly decreasing the expense of the meter required, other important features of the novel tachometer of this invention include the provision of a three winding saturable core transformer including a reset winding which makes possible not only satisfactory impedance matching to the less expensive meter, but provides for a resetting of the transformer so that the tachometer may be used in conjunction with the unbalanced or single ended input of a conventional automotive system. A further important feature of the circuit of this invention is the provision of an isolation amplifier and low pass filter which completely eliminates any possibility of harmonics generated in the primary circuit of the ignition coil from reaching the meter so as to produce an erroneous indication of speed.

Although saturable core devices have been proposed in the past for measuring frequency as disclosed, for example, in U.S. Patent 2,772,396, these frequency meters have not been particularly suited for use in conjunction with automotive ignition systems because of the difficulties involved with impedance matching over a complete cycle of operation so as to give an accurate output indication of frequency while at the same time providing for the complete isolation of the measuring circuit from harmonics in the ignition circuit of the engine.

It is therefore one object of the present invention to provide a novel electronic tachometer.

Another object of the present invention is to provide a relatively simplified inexpensive electronic tachometer usable with a less expensive meter movement.

Another object of the present invention is to provide an electronic tachometer of the saturable core transformer type providing harmonic isolation and hence a more accurate indication of speed.

Another object of the present invention is to provide an electronic tachometer utilizing a saturable core with primary, secondary, and reset windings particularly suited for use in monitoring the speed of internal combustion engines.

Another object of the present invention is to provide an automotive engine tachometer overcoming the disadvantages of prior capacitive discharge systems which are not usable with moving magnet meter movements having a sensitivity in the neighborhood of 5 milliamps and between 500 and 1500 ohms resistance. In the circuit of the instant tachometer the transformer action of the saturable core device transforms the impedance in the meter so that almost any sensitivity meter movement available can be used very efficiently in the circuit. The third or reset winding of the transformer permits impedance matching over a complete cycle of operation to accommodate the single ended conventional ignition system while a low pass filter and transistor are incorporated so that oscillations in the primary of the ignition coil are not coupled through to the meter circuit where they adversely affect the output reading.

These and further objects and advantages of the invention will be more apparent upon reference to the following specification, claims and appended drawings wherein:

FIGURE 1 is a circuit diagram of the novel tachometer of the present invention used in a conventional automotive ignition system; and FIGURE 2 is a magnetization curve for the saturable core in the transformer of FIGURE 1.

Referring to the drawings, there is shown a portion of an ignition circuit generally indicated at 10 including the novel tachometer of this invention enclosed by the dashed box 12. The tachometer is coupled between the positive power supply terminal 16 of the ignition system and a second terminal 18 adjacent the distributor 14. Positive supply voltage terminal 16 may constitute one side of a battery or other automotive electrical power source indicated at 20. The other terminal of the power supply is connected to ground as illustrated at 22.

In addition to the power supply, the conventional automotive ignition circuit includes an ignition coil primary winding 24, a coil resistor 26 and a distributor 14 including a rotating cam 28 actuating a breaker arm 30. Cam 28 operates in a well-known manner to periodically break the circuit of lead 32 conventionally coupling the ignition coil primary 24 to ground as indicated at 34.

Input terminal 18 of the tachometer 12 is coupled through a low pass filter comprising a series resistor 36 labeled $R_1$ and a shunt capacitor 38 labeled $C_1$ to the base electrode of an isolating transistor amplifier 40. This connection is through a clipping diode 42 labeled $D_1$ and a current limiting resistor 44 labeled $R_2$. The emitter of PNP transistor 40 is connected to the power supply terminal 16 through a second diode 46 labeled $D_2$ while the emitter and base of the transistor are coupled together by way of a third resistor 48 labeled $R_3$.

The collector of transistor 40 is connected through a resistor 50 labeled $R_4$ to the primary winding 52 of a saturable core transformer generally indicated at 54. Primary winding 54 is provided with two sections labeled $W_1$ and $W_2$, the midpoint of which is connected by way of lead 56 and through contacts 58 of a double pole double throw switch 60 to the midpoint of a reset winding 62 of saturable core transformer 54. This reset winding likewise is provided with two sections labeled $W_3$ and $W_4$ and is connected through a resistor 64 labeled $R_5$ to the emitter of transistor 40.

Primary winding 52 and reset winding 62 of the transformer are each connected through resistors 66 and 68 labeled $R_6$ and $R_7$ respectively to a second set of contacts 70 of the switch 60. A pair of movable blades 72 of the switch are adapted to engage either the contacts 58 for six-volt power supply operation or alternatively engage the contacts 70 for twelve-volt power supply operation. These two blades are coupled to ground as illustrated at 74.

Transformer 60 is also provided with a secondary winding 76 having three sections labeled $W_5$, $W_6$, and $W_7$ respectively. The secondary is provided with three taps—78, 80 and 82, and a four diode bridge circuit 84 is connected between one of these taps and grounded terminal 86 in turn connected to the lower end of the secondary winding 76. For operation with four cylinder internal combustion engines, lead 88 coupled to the bridge circuit 84 is connected to tap 82, for operation with a six cylinder engine lead 88 is connected to tap 80 and for operation with an eight cylinder engine lead 88 is connected to tap 78. Connected across the full wave rectifier bridge circuit 84 is an inexpensive meter 90 of the moving magnet type.

FIGURE 2 shows a hysteresis or magnetization curve for the core material of transformer 54 with flux density plotted as a function of magnetization force. Operation of the device is based upon the fact that by suitably polarizing the windings the core material can be switched between the position saturation level A, illustrated at 92 in FIGURE 2, and the negative saturation level B, illustrated at 94.

The points on a conventional breaker in an automotive ignition system open and close as a result of the action of cam 28 in the distributor. The opening and closing of the breaker points alternately connect input terminal 18 and hence resistor $R_1$ to ground 34 or to the plus voltage terminal 16 through the ignition coil primary 24 and the coil resistor 26. Resistor $R_1$ and capacitor $C_1$ together form a low pass RC filter that removes the high frequency harmonic oscillations existing in the circuit primary winding 26 from the tachometer circuit 12. Diode $D_1$ clips the input signal so that a plus voltage exceeding twelve volts cannot be applied to the base of transistor 40. Resistor $R_2$ limits the current that is applied to the base. Resistor $R_3$ in combination with diode $D_2$ produce a negative voltage at the transistor base to prevent thermal run-away. Transistor 40 is switched from a fully conducting mode when the points are closed to a non-conducting condition when the points of the breaker are open.

Transformer 54 operates in a saturated condition. Reset winding 62 produces a magnetization force H that places the flux density in the transformer at point A on the magnetization curve shown in FIGURE 2. When transistor 40 is conducting a magnetization force is produced by primary winding 52 which, when subtracted from the magnetization force of the reset winding 62, places the transformer core at a position B on the magnetization curve. As the transistor is swiched a voltage is produced that is proportional to $Nd\phi/dt$. In accordance with the mathematics set out, for example in U.S. Patent 2,772,396, it is found that the voltage produced has a constant volt-second relationship and is independent of the supply voltage or the rate of switching. Furthermore, the output is significantly independent of temperature and other variations.

In FIGURE 1, windings $W_1$ and $W_2$ constituting primary 52 generate the controlled output voltage. Winding section $W_5$ determines the exact size and shape of the output pulse and is designed so that when it is connected to the bridge rectifier and correspondingly to the low sensitivity moving magnet type meter 90 it produces a voltage that is proportional to the r.p.m of an eight cylinder car. To be more precise, in the specific circuit shown, when winding $W_5$ is connected to a 10 milliamp meter 90 with an internal resistance of 520 ohms, the voltage produced, when the circuit is connected to an eight cylinder engine operating at 8,000 r.p.m.'s, moves the meter 90 to full scale or 10 milliamps. Winding sections $W_6$ and $W_5$ together accomplish the same result except for a six cylinder engine. Winding sections $W_6$, $W_7$ and $W_5$ in series produce these same results for a four cylinder engine. Resistors $R_4$, $R_5$, $R_6$, and $R_7$ are current limiting resistors and are chosen to produce the required saturation flux densities. Switch 60 is provided to operate the circuit on both 6 and 12 volt automobiles. Switch 60 changes the number of turns on the transformer and also changes the current limiting resistors to compensate for the change in voltage.

It is apparent from the above that the present invention provides a relatively simplified frequency measuring device particularly suited for use as a tachometer in measuring the speed of internal combustion and especially automotive engines. Important features of the present invention include the provision of an impedance matching saturable core transformer having a third or a reset winding making it possible to obtain optimum impedance match over a complete cycle. Another important feature of the tachometer arrangement is the fact that a low pass filter and an isolating transistor are connected in series with the ignition primary coil so that the meter portion of the tachometer is completely isolated from harmonics or other high frequency oscillations which may be generated in the automotive ignition circuit due to the opening and closing of the points in the automobile distributor. This isolation is, of course, necessary to satisfactory operation since any high frequency signals passing through the transformer to the bridge circuit 84 would be rectified and appear as an erroneous indication on the meter 90. A relatively simplified and inexpensive construction and arrangement is provided making the device universally applicable to engines having different numbers of cylinders and having either a six or twelve volt power supply.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electrical tachometer comprising a pair of power supply terminals, an input terminal, a transistor amplifier, a low pass filter coupling said transistor amplifier to said input terminal, a core having primary, secondary, and reset windings, said core exhibiting two substantially constant flux density saturation states, said transistor being connected in series with said primary winding between said power supply terminals, means coupling said reset winding between said power supply terminals in parallel with said transistor and said primary winding, a rectifier coupled to said secondary winding, a moving magnet meter coupled to the output of said rectifier, said secondary winding including a plurality of sections, and means for coupling a different number of said secondary winding sections to said rectifier.

2. A tachometer according to claim 1 wherein said primary and reset windings have a plurality of sections, and switch means coupled to said windings for varying the number of sections of said primary and reset windings between said power supply terminals.

3. An electrical tachometer comprising a pair of power supply terminals, an input terminal, a transistor amplifier, a low pass filter coupling the base of said transistor amplifier to said input terminal, a core having primary, secondary, and reset windings, said core exhibiting two substantially constant flux density saturation states, the emitter-collector circuit of said transistor being connected in series with said primary winding between said power supply terminals, means coupling said reset winding between said power supply terminals in parallel with said transistor and said primary winding, a full wave rectifier coupled to said secondary winding, a moving magnet meter coupled to the output of said full wave rectifier, said secondary winding including a plurality of sections, and taps on said secondary winding for coupling selected sections to said meter according to the number of cylinders in an engine whose speed is being measured.

4. A tachometer according to claim 3 wherein said primary and reset windings have a plurality of sections, resistors in series with said primary and reset windings, and switch means coupled to said windings and resistors for varying the number of sections and amount of resistance between said power supply terminals according to the value of a power supply coupled to said terminals.

References Cited
UNITED STATES PATENTS

| | | | |
|---|---|---|---|
| 2,908,864 | 10/1959 | Shepard | 324—80 |
| 3,268,811 | 8/1966 | Jefferson | 324—70 |

FOREIGN PATENTS

| | | |
|---|---|---|
| 151,162 | 8/1955 | Sweden. |

WALTER L. CARLSON, *Primary Examiner.*

M. J. LYNCH, *Assistant Examiner.*